G. L. GAY.
BAKING OVEN AND LOADING DEVICE THEREFOR.
APPLICATION FILED MAY 17, 1919.
1,348,355.
Patented Aug. 3, 1920.
5 SHEETS—SHEET 4.
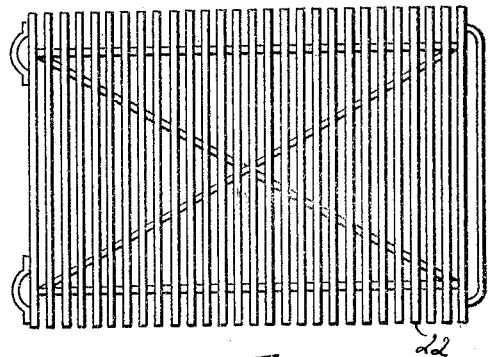
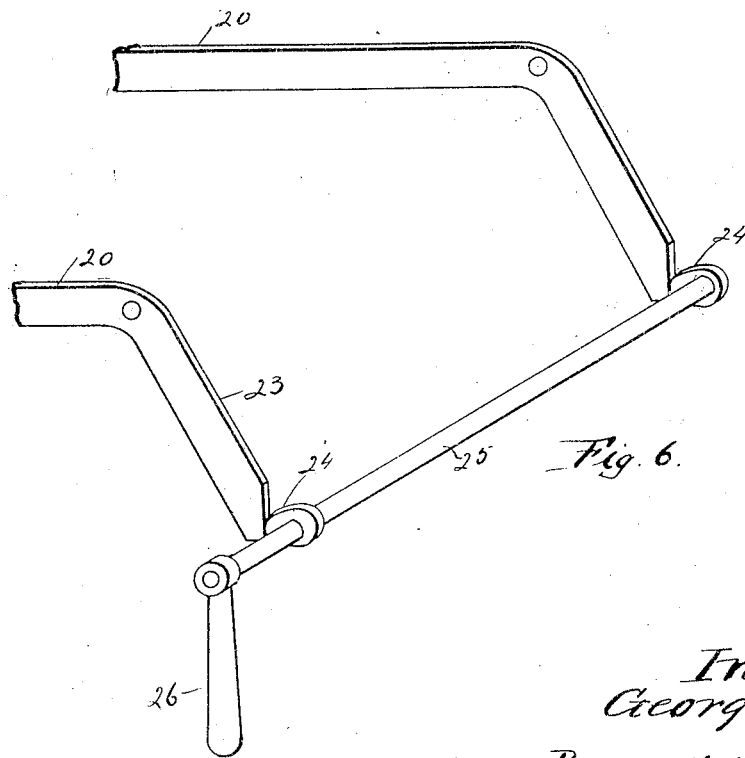
Inventor
George L. Gay.
By W. W. Williamson
Atty.

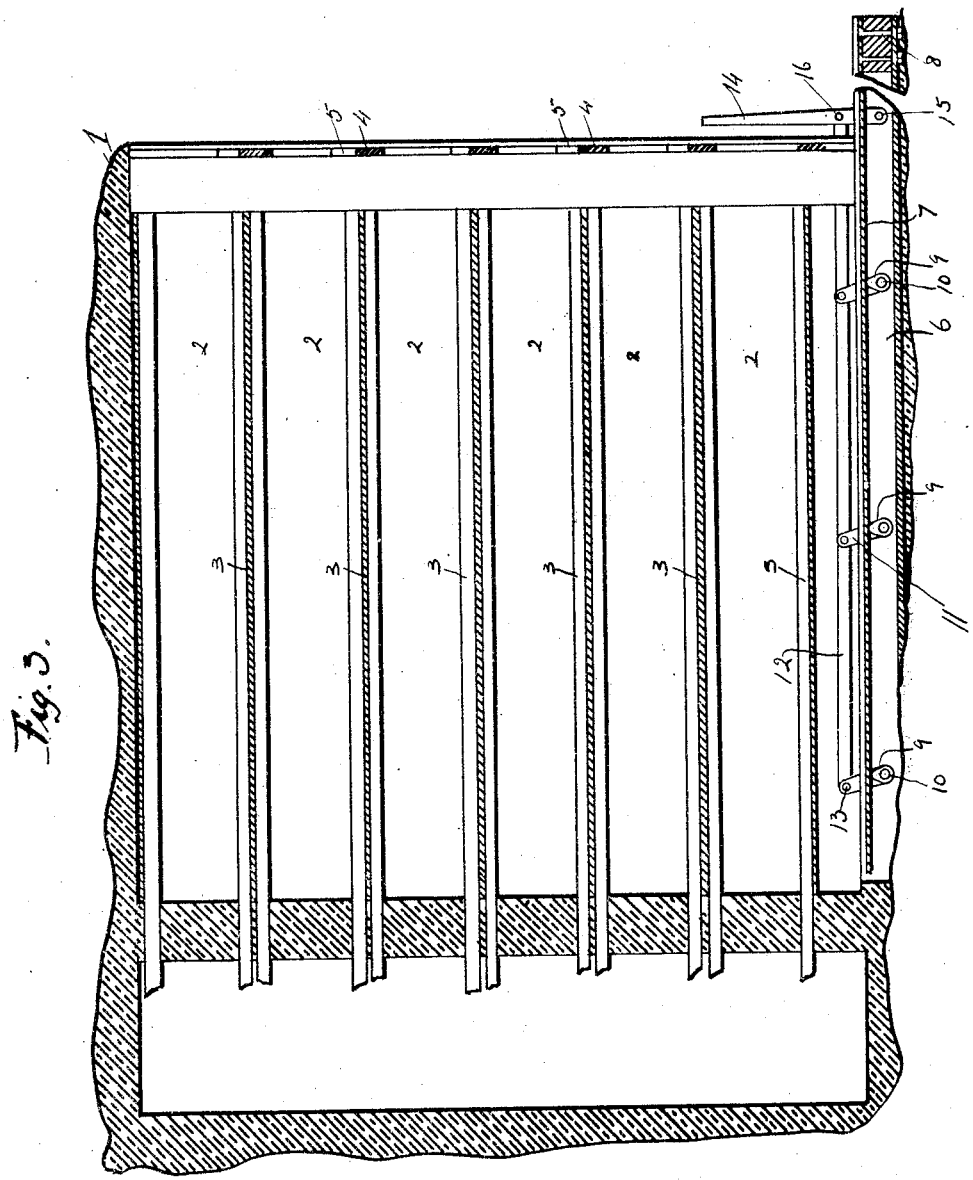

G. L. GAY.
BAKING OVEN AND LOADING DEVICE THEREFOR.
APPLICATION FILED MAY 17, 1919.
1,348,355.
Patented Aug. 3, 1920.
5 SHEETS—SHEET 5.
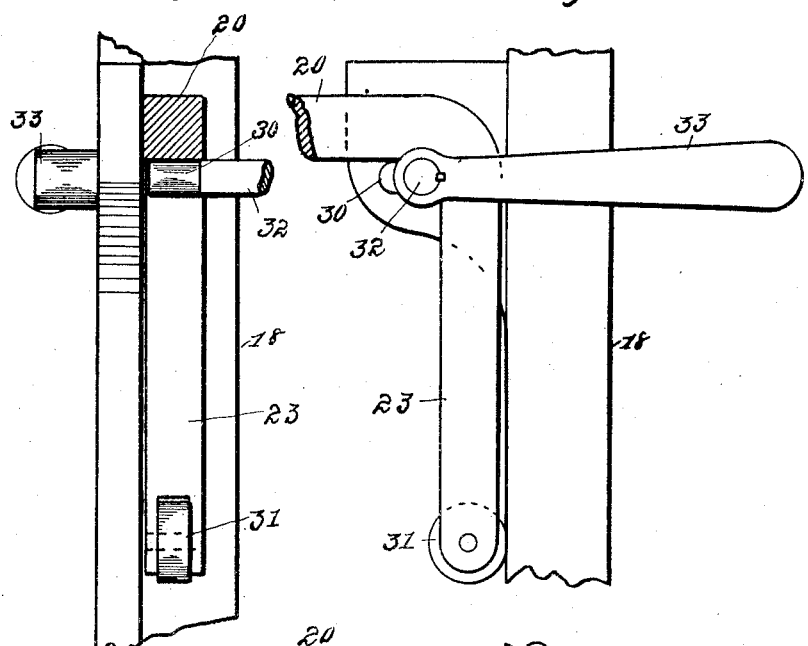
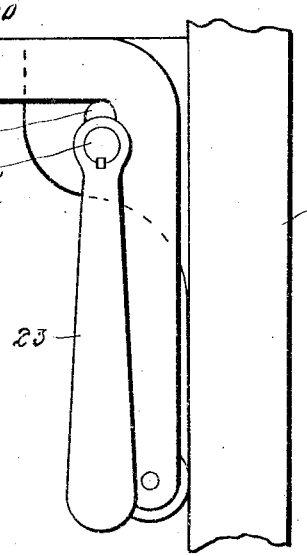
Inventor
George L. Gay
By W. W. Williamson
Atty.

UNITED STATES PATENT OFFICE.

GEORGE L. GAY, OF PHILADELPHIA, PENNSYLVANIA, ASSIGNOR OF ONE-HALF TO FRANK WHITTMANN, OF PHILADELPHIA, PENNSYLVANIA.

BAKING-OVEN AND LOADING DEVICE THEREFOR.

1,348,355.  Specification of Letters Patent.  Patented Aug. 3, 1920.

Application filed May 17, 1919. Serial No. 297,810.

*To all whom it may concern:*

Be it known that I, GEORGE L. GAY, a citizen of the United States, residing at Philadelphia, in the county of Philadelphia and State of Pennsylvania, have invented new and useful Improvements in Baking-Ovens and Loading Devices Therefor, of which the following is a specification.

My invention relates to a new and useful improvement in baking ovens and loading devices therefor, and has for its object to so construct such an oven and a loading device therefor as to permit the entire filling of the oven with the bread or other material to be baked at one operation or the removing from the oven of its entire contents in one operation without undue jar or vibration which has heretofore tended to affect certain doughs after being raised and before being baked.

A further object of my invention is to provide for loading any particular shelf of the oven without interference with material from the other shelves, and to remove from the oven the contents of any particular shelf independent of the remainder of its contents.

A still further object of my invention is to so construct a loading device that it will not only serve to completely load an oven at one operation or remove the entire contents therefrom, but will serve as a transferring and storing rack whereby the bread dough or the like may be placed thereon in trays and conveyed to the raising room and after being subjected to the proper temperature for a sufficient length of time may be then rolled to the oven and also when bread or the like has been removed from the oven it may be conveyed to the point desired by rolling the loading device upon its wheels and there utilized for storage, thus avoiding the blocking of the space in front of the oven which in many cases becomes a serious handicap to the baking operations.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawing forming a part of this application, in which:—

Fig. 3, is a vertical, longitudinal section of the oven showing the interior arrangement thereof.

Fig. 4, is a plan view of one of the trays used to load the loading device.

Fig. 5, is an end view of Fig. 4.

Fig. 6, is a detail perspective of the mechanism for raising and lowering one pair of arms of the loading device independent of the other pairs.

Fig. 7, is an enlarged view of a slightly modified form of the mechanism for raising and lowering the rack arms 20 showing one of the arms in its lowered position.

Fig. 8, is a view similar to Fig. 7, showing the arms in its elevated position.

Fig. 9, is an end view of Fig. 7 the arms being in section.

Figure 1:
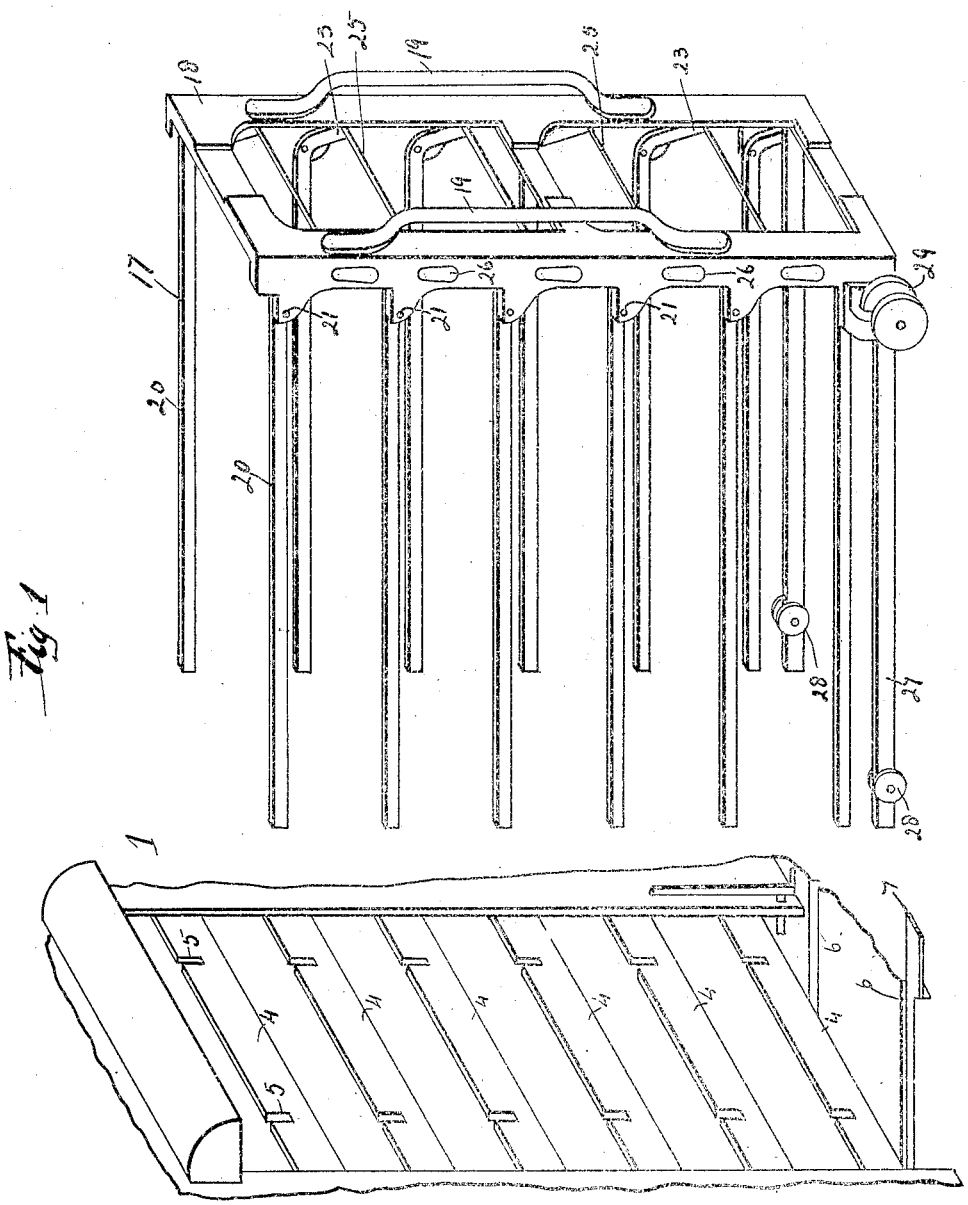
Figure 1, is a perspective of a portion of a brick baking oven and my improved loading device showing the latter in line with the charging door of the oven in position to enter the latter.
Figure 2:
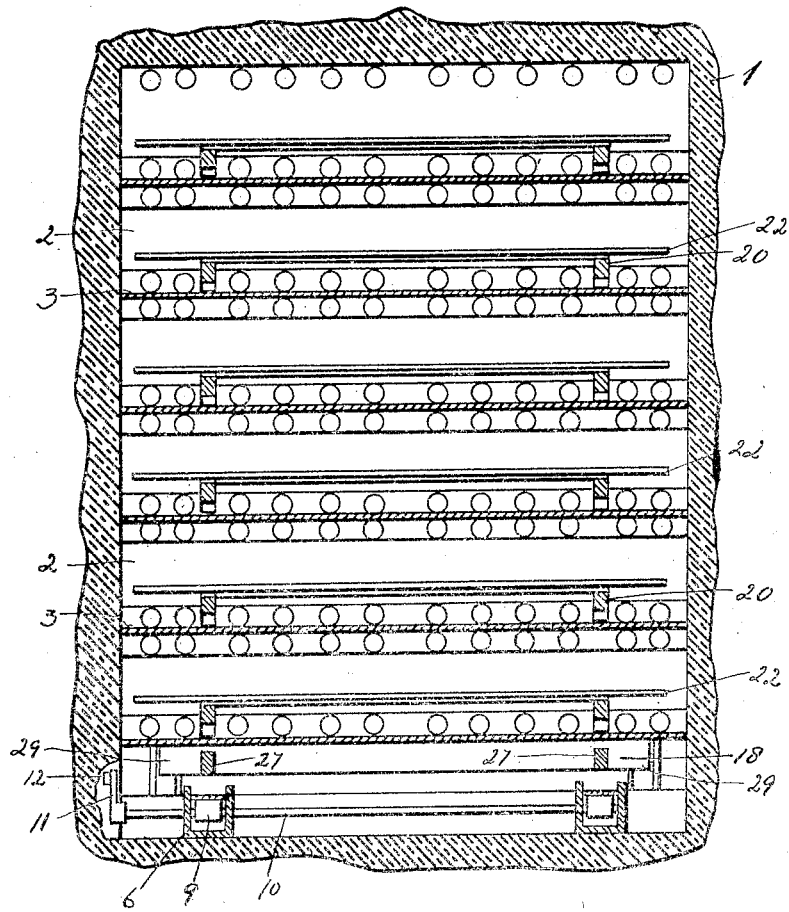
Fig. 2, is a vertical cross section of the interior of the oven showing the shelves or partitions which divide the oven into a series of compartments, and also the arrangement of the mechanism for raising and lowering the track upon which the loading device travels.

In carrying out my invention as here embodied, 1 represents the oven which may be of any suitable or well known construction, being divided into a number of compartments 2 by the shelves or partitions 3 which shelves may consist of suitably arranged piping for asbestos or other non-conducting material interposed therebetween, and in the front of each of these shelves is located a cross plate 4 of approximately the same width as the thickness of the shelves and these plates have the slots 5 formed therein for the reception of the arms of the loading device, which is to be hereafter described.

Lengthwise of the bottom of the oven upon either side thereof are formed grooves or channels 6, and these channels extend outside of the oven to any suitable point, and each has located therein a rail 7 which is fastened at its outer end by the bolts 8 and supported along its length within the oven by the cams 9. These cams are secured upon the shafts 10 in pairs and all caused to operate in unison by the crank arms 11 being secured upon the ends of the shafts and connected together by the operating rod 12 the crank arms being pivoted to said rod at 13.

14 represents the operating lever which is pivoted at 15 and has an operating rod 12 pivoted thereto at 6. This operating rod is located in front of the oven and in easy access of the operator in order that by the manipulation of this lever the tracks may be raised or lowered for the purpose hereinafter set forth.

17 represents the loading device which consists of a suitable frame 18 for convenience in manipulating the same, and to this frame are pivoted the rack arms 20 at 21, said arms being arranged in pairs so as to support the trays 22 in the proper position to be passed into the oven during the loading operation or withdrawn therefrom during the unloading of the oven. The inner end 23 of each of the rack arms extends downward and bears against one of the cams 24, said cams being secured in pairs upon the rods 25 which latter are journaled in the sides of the frame 18, each of said rods having a handle 26 secured upon one end thereof for operating the cams and to raise or lower the outer portions thereof, as will be readily understood.

When the cams are in the position shown in Fig. 6 the rack arms 19 will be locked in their normally elevated position, but by turning the handle 26 the cams will be so swung as to lower the outer portion of the rack arms.

The frame 18 of the loading device has rigidly secured thereto the bars 27 which extend in the same direction as the arms 20 and are of approximately the same length and to the rear end of these bars are journaled the wheels 28 while to the sides of the frame are secured the caster wheels 29 so that the loading device may be used after the manner of a truck rolled from place to place over the floor, and also be rolled upon the tracks 7 when charging or discharging the oven.

From the foregoing description the operation of my improvement will be obviously as follows:—

The pans of dough to be baked are placed upon the trays 22 and the latter placed upon the arms 20 of the loading device, said arms serving as racks for carrying the trays, and when these racks are filled the loading device is rolled to the front of the furnace in such position that the wheels 28 which pass upon the tracks 7 will put the free ends of the rack bars into alinement with the slots 6 when by shoving the loading device forward the rack arms and the load carried thereby will pass into the oven bringing the load of each pair of rack arms immediately above a shelf or partition 3 the rack arms lying in the grooves 5. Now by drawing upon the operating lever 14 the cams 9 will be so turned as to lower the track 7 thus lowering the rack arms so as to place the trays 22 and the contents thereof upon the shelves or partitions the rack arms passing out of contact with the trays. This will permit the loading device to be withdrawn from the oven lifting the trays and their contents therein for the baking operations.

After the baking process has been completed the loading device is again inserted in the oven as just described and the tracks 7 elevated by the proper movement of the operating lever 14 so as to cause the rack arms to pick up the trays previously deposited upon the shelves after which the wheeling device may be withdrawn from the oven and rolled to any point of delivery desired or be used as a shoving rack for holding the trays and their contents until needed for shipment.

It often becomes desirable to load an oven with several different kinds of dough for baking such as bread, cakes, crackers and pies which may take different times for the proper baking thereof, in which case it is advantageous to be able to remove portions of the contents of one of the compartments of the oven and in such event the loading device is shoved into the oven as before set forth and the proper pair of arms for removing the contents of the particular compartment will be elevated by the manipulation of their handle 26 which will pick up the trays in that compartment without interfering with the trays in the other compartments when the loading device may be withdrawn from the oven bringing with it only the contents of that particular compartment. This arrangement provides for the loading or unloading of any particular compartment of an oven independent of the other compartments and gives my improved loader a wider range of usefulness.

Heretofore the loading of large multiple compartments for ovens has been a relatively slow and tedious operation often with injurious efforts to the material being handled in that the trays carrying the pans of dough were either slid into the compartments one by one or else rolled therein on small wheels which jointed and vibrated the dough to such an extent that certain mixtures are injuriously affected and the total process required considerable time causing loss of heating through the open door of the oven, whereas all of these disadvantages are entirely overcome by my improvement since the whole oven may be loaded in a small fraction of time and without undue jar or vibration to the contents, and may as quickly be removed after the baking process.

In the modification shown in Figs. 7, 8 and 9 the rack arms 20 are arranged to rest upon the cams 30, the heel ends 23 of said arms being provided with walls 31 which bear against the front of the frame so as to facilitate the up and down movement of these rack arms as will be readily understood.

The cams 30 are formed or secured upon the shafts 32, each shaft being provided with a handle 33 for proper manipulation, said handles being so set that when the rack arms are in their elevated position the handle will be turned downward, when said arms are in their lowered positions the handles will be approximately horizontal.

Of course I do not wish to be limited to the exact details of construction as herein shown, as these may be varied within the limits of the appended claims without departing from the spirit of my invention.

Having thus fully described my invention, what I claim as new and useful is:

1. In combination with a baking oven, a loading device consisting of a frame mounted upon suitable wheels, rack arms attached at their inner ends to said frame their outer ends being free, and means for raising and lowering the device.

2. In combination with a baking oven having tracks therein, a loading device consisting of a frame mounted upon suitable wheels for traveling upon said tracks, rack arms secured at their inner ends to said frame, their outer ends being free to enter slots formed in the shelves of the oven, and means for raising and lowering the tracks for raising and lowering the loading device.

3. In combination with a baking oven having tracks therein, a loading device consisting of a frame mounted upon suitable wheels for traveling upon said tracks, rack arms secured at their inner ends to said frame, their outer ends being free to enter slots formed in the shelves of the oven, means for raising and lowering the tracks for raising and lowering the loading device, and means for raising and lowering the rack arms in pairs.

4. The herein described combination of a baking oven divided into compartments by a series of shelves, tracks located in the bottom of the oven, means for raising and lowering said tracks, a loading device mounted upon suitable wheels for traveling upon said tracks, rack arms projecting from said loading device and adapted to pass through the slots formed in the shelves so that when said loading device is raised or lowered by the raising and lowering of the tracks a load may be transferred to or from the shelves.

5. The herein described combination of a baking oven divided into compartments by a series of shelves, tracks located in the bottom of the oven, means for raising and lowering said tracks, a loading device mounted upon suitable wheels for traveling upon said tracks, rack arms projecting from said loading device and adapted to pass through the slots formed in the shelves so that when said loading device is raised or lowered by the raising and lowering of the tracks, a load may be transferred to or from the shelves, and means for raising and lowering the rack arms in pairs for loading or unloading certain of the compartments of the oven.

6. The herein described combination of a baking oven, shelves dividing said oven into compartments, each of said shelves having two grooves therein, two tracks located in the bottom of the oven extending outside thereof, cams for raising and lowering said tracks in unison, means for manually operating said cams, a loading device consisting of a frame, and wheels upon which said frame is mounted, said wheels adapted to travel upon said tracks, rack arms pivoted to the frame, their free ends being adapted to enter the slots in the shelves, and means for raising and lowering the rack arms in pairs.

In testimony whereof I have hereunto affixed my signature.

GEORGE L. GAY.